(12) United States Patent
Nicholas et al.

(10) Patent No.: US 9,186,289 B2
(45) Date of Patent: Nov. 17, 2015

(54) ANTI-TIPPING SAFETY DEVICE

(71) Applicants: James Nicholas, Stockton, CA (US); George Nicholas, Reno, NV (US)

(72) Inventors: James Nicholas, Stockton, CA (US); George Nicholas, Reno, NV (US)

( * ) Notice: Subject to any disclaimer, the term of this patent is extended or adjusted under 35 U.S.C. 154(b) by 0 days.

(21) Appl. No.: 14/657,952

(22) Filed: Mar. 13, 2015

(65) Prior Publication Data

US 2015/0290055 A1    Oct. 15, 2015

Related U.S. Application Data

(63) Continuation-in-part of application No. 61/979,167, filed on Apr. 14, 2014.

(51) Int. Cl.
| | | |
|---|---|---|
| *A61H 3/04* | (2006.01) | |
| *A61G 5/10* | (2006.01) | |
| *A61H 3/06* | (2006.01) | |

(52) U.S. Cl.
CPC .. *A61G 5/10* (2013.01); *A61H 3/04* (2013.01); *A61G 2005/1089* (2013.01); *A61H 3/06* (2013.01); *A61H 2003/043* (2013.01)

(58) Field of Classification Search
CPC .............. A61G 5/10; A61H 2003/043; A61H 2003/046; A61H 3/06; A61H 3/061
See application file for complete search history.

(56) References Cited

U.S. PATENT DOCUMENTS

| | | | | | |
|---|---|---|---|---|---|
| 5,973,618 | A | * | 10/1999 | Ellis | A61H 3/061 135/75 |
| 6,062,600 | A | * | 5/2000 | Kamen | A61G 5/04 280/250.1 |
| 6,530,598 | B1 | * | 3/2003 | Kirby | A61G 5/10 280/647 |
| 7,779,850 | B2 | * | 8/2010 | Caldwell | A61H 3/04 135/66 |
| 2005/0229961 | A1 | * | 10/2005 | Takizawa | A61H 3/04 135/67 |
| 2006/0091663 | A1 | * | 5/2006 | Jackson | A61G 5/042 280/755 |
| 2006/0129308 | A1 | * | 6/2006 | Kates | A61H 3/061 701/532 |
| 2007/0222199 | A1 | * | 9/2007 | Schattner | A61G 5/10 280/755 |
| 2008/0157513 | A1 | * | 7/2008 | Cheng | A61G 5/042 280/755 |
| 2008/0179868 | A1 | * | 7/2008 | Cokeley | B60S 9/16 280/755 |
| 2014/0196757 | A1 | * | 7/2014 | Goffer | A61H 3/02 135/66 |

* cited by examiner

*Primary Examiner* — Jeffrey J Restifo
*Assistant Examiner* — Erez Gurari
(74) *Attorney, Agent, or Firm* — Clement Cheng

(57) ABSTRACT

An electromagnetic anti-tipping device uses electromagnets to steady users and prevent falls by persons with impaired mobility and balance. The device's steadying effect is accomplished by magnetically attracting the legs and/or wheels of balance and mobility assisting apparatus ("balance and mobility aid(s)") to a stationary surface such as a floor which is made of or covered with a magnetically responsive material. In one embodiment, the device's electromagnet attraction to the floor or other stationary surface is actuated when the operator of the device triggers the device's mechanism or sensor by grip or touch. Once actuated, and until deactivation by the user, the device's electromagnet(s) secure the legs or wheels of the balance and mobility aid to the magnetically responsive floor or other stationary surface. The electromagnets are battery-powered.

14 Claims, 10 Drawing Sheets

ANTI-TIPPING SAFETY DEVICE

This application is a continuation in part of and claims priority from U.S. provisional application 61/979,167 by same inventors James Nicholas and George Nicholas, filed Apr. 14, 2014, the disclosure of which is incorporated herein by reference.

FIELD OF THE INVENTION

The present invention is in the field of electromagnetic anti-tipping safety device for preventing falls by users of mobile balance and mobility aids.

DISCUSSION OF RELATED ART

There is a well-recognized need to prevent, for example, falls by persons with impaired mobility and balance ("impaired persons"), including but not limited to disabled and elderly persons. Such falls by impaired individuals frequently lead to life-threatening injuries such as broken hips, legs and arms as well as head injuries. Impaired persons commonly utilize mobile balance and mobility aids such as walkers and four-point canes in an effort to maintain balance and prevent falls. A device is desirable which would enhance such balance and mobility aids so as to prevent many of the falls and related injuries that occur in spite of their use. It is known to have fixed balance and mobility aids for use by impaired persons which are attached to stationary surfaces such as walls or floors, such as grab bars or railings, to maintain balance and prevent falls. By their nature, however, such fixed balance and mobility aids are available for use only where installed or erected.

It is further known to have mobile, hand-held or hand-pushed balance and mobility aids such as walkers and four-point canes. In contrast to the fixed mobility and balance aids described above, which do not move, such mobile balance and mobility aids are carried, pushed or otherwise moved by balance-impaired persons as they move about. Impaired persons, by supporting and/or balancing their weight on such mobile devices, are often able to stand, walk and otherwise move about without losing their balance and falling. Such mobile devices do not provide the secure attachment to a stationary surface which would be provided by a fixed grab bar or railing. Impaired persons using existing mobile balance and mobility aids are nevertheless prone to falling or tipping backward, forward or sideways, despite their use of such aids. Mobility impaired persons also have difficulty in navigating a deck of maritime vessels such as cruise ships in rough weather.

BRIEF SUMMARY OF INVENTION

An electromagnetic anti-tipping device uses electromagnets to steady users and prevent falls by persons with impaired mobility and balance. The device's steadying effect is accomplished by magnetically attracting the legs and/or wheels of balance and mobility assisting apparatus ("balance and mobility aid(s)") to a stationary surface such as a floor which is made of or covered with a magnetically responsive material. In one embodiment, the device's electromagnet attraction to the floor or other stationary surface is actuated when the operator of the device triggers the device's mechanism or sensor by grip or touch. Once actuated, and until deactivation by the user, the device's electromagnet(s) secure the legs or wheels of the balance and mobility aid to the magnetically responsive floor or other stationary surface. The electromagnets are battery-powered.

An object of the present invention is to provide a mobile balance and mobility aid that overcomes the above described disadvantages. Mobility aids are physical devices used by temporarily and permanently disabled persons as an aid to balance and mobility.

More particularly, the present invention provides in its preferred embodiment a battery powered electromagnetic mechanism by which mobile balance and mobility aids, such as walkers and four-point canes, may become securely attached to a stationary surface, generally a floor which is made of or covered with a magnetically responsive material, at any point and at the option of the user of the mobile balance and mobility device. This secure attachment occurs when the user of the mobile balance and mobility aid, by way of a grip, touch or switch-activated triggering mechanism, activates electromagnets within the mobility aid, which electromagnets cause the legs and/or wheels of the mobility aid to be attracted magnetically to the magnetically responsive floor beneath them. As long as the electromagnetic attraction is activated, the balance and mobility aid in effect becomes a fixed balance aid, in the nature of a fixed grab bar or railing.

The user of the balance aid may trigger the mobility aid's electromagnets, thereby securing the device to the stationary surface, for example a floor, whenever the user feels a loss of balance or otherwise desires the enhanced support provided by a fixed balance aid. In this manner, the invention provides a mobile balance and mobility aid that is also, at the user's option, a fixed grab bar or railing.

According to one aspect of this invention, a mechanism triggering the magnetic attraction of the mobility aid to the magnetically responsive surface or floor is located in the grips of the mobility aid, for example a walker's grips or the handle of a four-point cane. This mechanism comprises and includes a sensing pad or pads monitoring the force being exerted on the grips or handle by the user and is to be calibrated for use by the individual user of the particular mobility aid device. When the force the user exerts on the pad or pads exceeds a certain PSI as determined during the calibration process, the electromagnets are activated, effectively attaching the once mobile walker or cane securely to the floor and thereby allowing the user to apply substantially greater force to the mobility aid in order to regain balance. In this embodiment, the magnetic attraction between the mobility aid device and the magnetically attractive floor may be triggered at the user's choice and also by the user's involuntary action of tightly gripping the mobility aid device when conscious of a feeling of loss of balance or falling. As soon as the magnetic anti-tipping device is deactivated by the operator, the electromagnets become inactive and are no longer attracted to the magnetically attractive floor, in the case of a walker, enabling the operator to continue moving with the walker just as they had been before they activated the magnetic anti-tipping device.

An additional feature of this embodiment of the magnetic anti-tipping device is an electromagnetic movement compensation system whereby, if the operator begins to lose balance and in so doing partially lifts one or more legs of the, for example, walker, from magnetically attractive surface or floor before activating the magnetic anti-tipping device, the electromagnet movement compensation system will, by operation of springs and pushrods, maintain contact between the electromagnet(s) and the magnetically attractive surface or floor, until the spring and pushrod mechanism(s) reaches maximum travel, at which point it (they) will travel with the walker upwards or away from the magnetically attractive surface. As long as the operator activates the magnetic anti-tipping device by means of the mechanical or electrical activation system before the electromagnets are beyond the functioning distance from the magnetically conducting surface or floor, the magnetic anti-tipping device will attach the walker to the floor until the operator releases the activation system.

According to another aspect of this invention, a mechanism triggering the magnetic attraction of the balance and mobility aid, for example walker or four point cane, to the magnetically responsive surface or floor is an on-off static electrical switch near the grips or handle of the mobility aid. When in the "on" position, the triggering mechanism activates the electromagnets in the balance and mobility aid device, effectively transforming the device from a mobile balance and mobility aid to a fixed and stationary aid in the nature of a fixed grab bar or handrail. In this aspect of the invention, the magnetic attraction between the balance and mobility aid device and the magnetically attractive surface, for example floor, may be triggered at the user's choice, for example for the purpose of using such a device as a portable grab bar to assist with transferring to and from, for example, a bed, chair, or toilet. According to this aspect, the device's electromagnetic attraction may remain activated for the duration of the battery life of the electromagnets, according to the needs and desires of the user. Manual or automatic controls can be added to the mobility device for triggering the magnetic attraction.

SUMMARY OF THE CLAIMS

An anti-tipping mechanism is for use on a floor and includes a mobility aid having a frame. Electromagnets are mounted to the frame. The electromagnets secure and balance the frame when activated by attracting to the floor that the mobility aid is moving upon. The electromagnets are secured to the frame at a lower portion of the frame. A control has a first mode, and a second mode. The first mode deactivates the electromagnets, and the second mode activates the electromagnets. A battery that is electrically connected to the electromagnets allows for activating the electromagnets.

The anti-tipping mechanism also optionally has a spring that provides a suspension to the electromagnet. The electromagnet contacts with the floor when a portion of the mobility aid is lifted above the floor. The third mode selectively activates the electromagnets. A tipping sensor is configured to sense tipping of the mobility aid. The electromagnet is configured to activate when the tipping sensor senses tipping of the mobility aid. A pair of wheels can be connected to the lower portion of the frame. The wheels provide a rolling movement for the user. The mobility aid can be a mobility scooter or a walker.

The following callout list of elements can be a useful guide in referencing the element numbers of the drawings.

8 Electromagnet
10 Pushrod
12 Spring
14 Sleeve
15 Frame
16 Wheels
17 Flat Portion Of Frame
18 CPU Battery Pack
20 Pressure Sensing Electric Pad
22 Low Friction Skid
24 Control Panel For The Magnetic Anti-Tipping Device
30 Switch
32 Speaker
34 Light
36 Battery Level Indicator
38 Conducting Surface Floor
41 Tipping Sensor
42 Tilt Sensor
43 Accelerometer
44 Processor
52 Mobility Scooter

DETAILED DESCRIPTION OF THE PREFERRED EMBODIMENT

Figure 1:
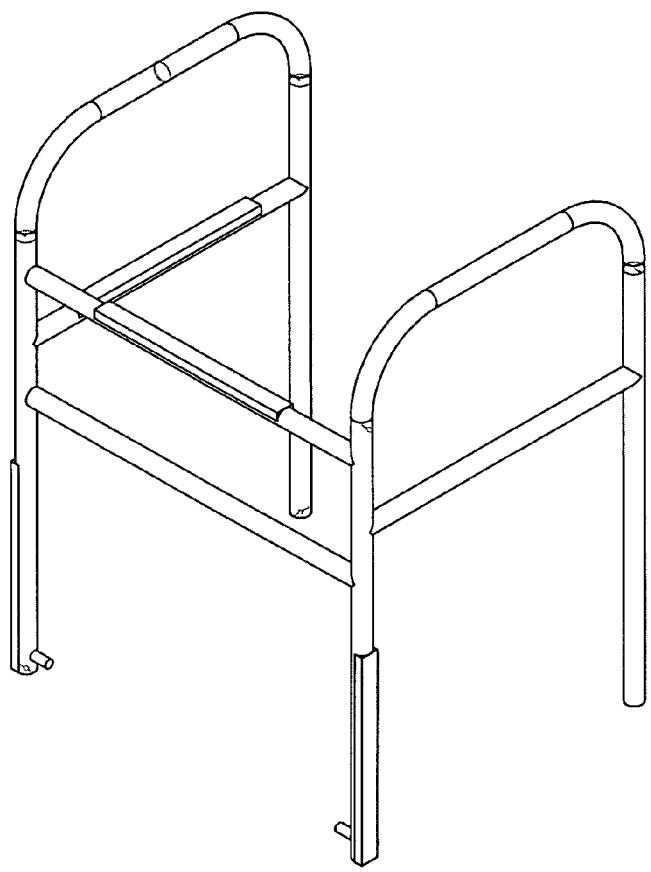
FIG. 1 is an isometric view of a prior art walker without electromagnetic anti-tipping safety device.

A general example of a prior-art walker-type balance and mobility aid device is shown in FIG. 1. Such walkers generally consist of a metal tubular frame with four legs and handle bars at the top of the sides of the frame. The user typically stands and moves within the frame, holding onto the handles for balance and weight support. Such walkers may have wheels on the front two legs and skids on the rear two legs. Alternatively, walkers may have wheels on the ends of all four legs, or skids on all four legs. The user pushes and/or lifts the walker in front of him or her as he or she moves. Other examples of prior art balance and mobility aids are: the four-point cane; motorized "scooter," or small, three- or four-wheeled battery-powered, motorized vehicle with seat and handlebars; a framed and raised toilet seat, which stands on four legs; and bench or seat placed inside a tub or shower for use while bathing.

A simple, efficient magnetic anti-tipping device is provided as a safety mechanism intended to prevent users of balance and mobility aids, for example those identified above, from "tipping over" and falling while using such aids. Once triggered, this safety mechanism operates by magnetically attracting the balance and mobility device to a stationary surface, generally a floor which is made of or covered with a magnetically responsive material, at the option of the user of the mobile balance and mobility device. One example of a magnetically responsive material is a steel deck of a cruise ship.

Figure 2:
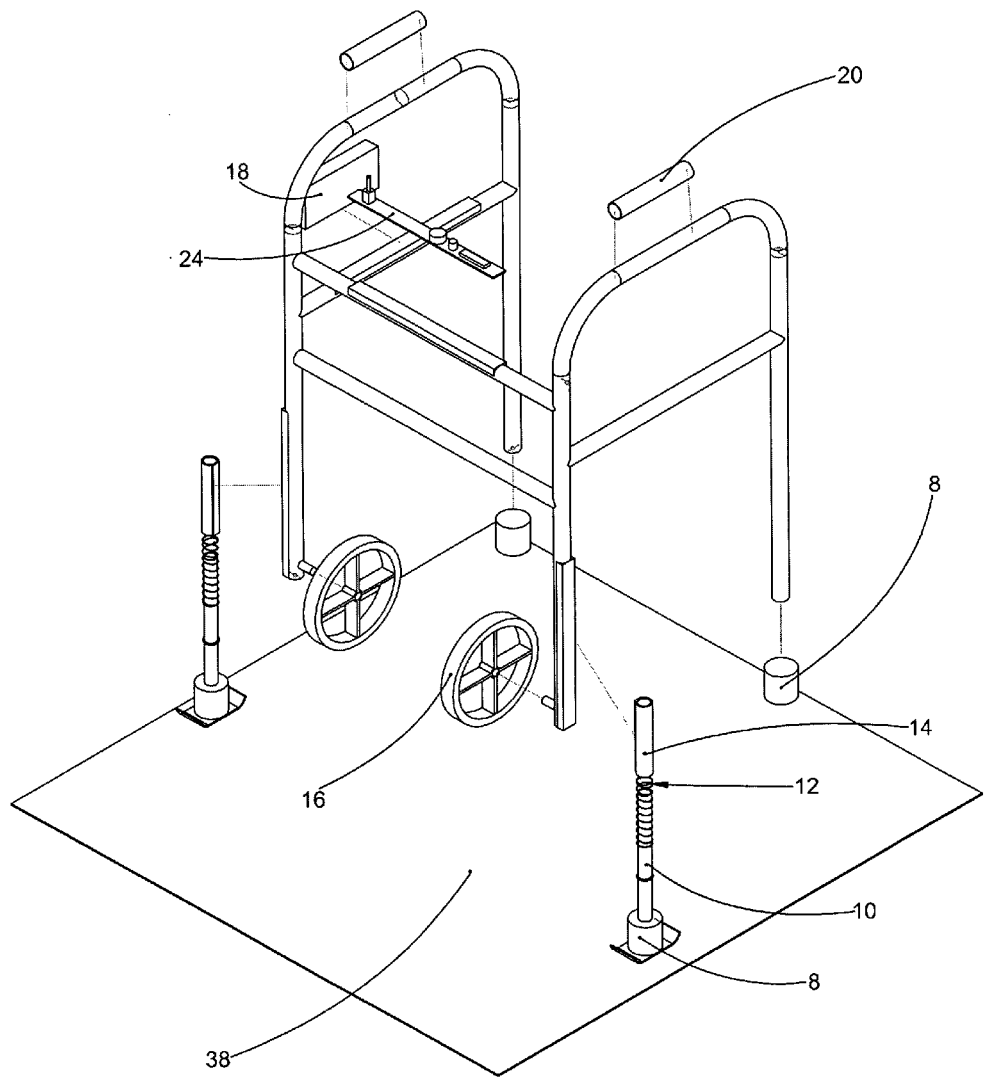
FIG. 2 is an exploded view of a walker with one embodiment of the electromagnetic anti-tipping safety device.
Figure 3:
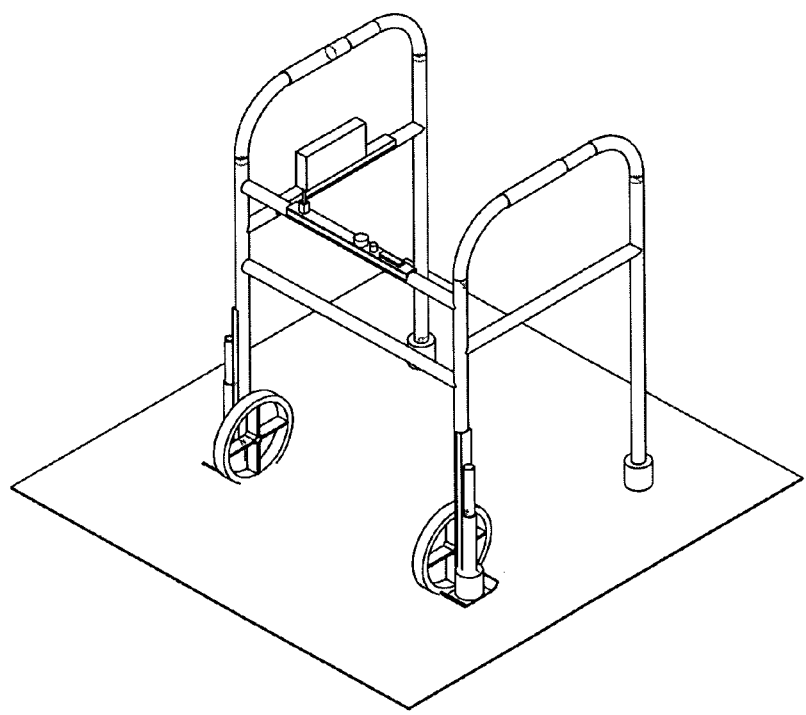
FIG. 3 is an isometric view of a walker with one embodiment of the electromagnetic anti-tipping safety device.

In FIGS. 2 and 3, one embodiment of the magnetic anti-tipping safety device is depicted as mounted on the front leg 5 of a walker-type balance and mobility aid. FIG. 2 presents an exploded view of the elements and features of this embodiment. As seen in FIG. 2, a total of four electromagnets 8 can be used for retaining four corners of the frame of a mobility aid. FIG. 3 shows an unexploded view thereof. This embodiment features an electromagnet movement compensation system, also shown at FIGS. 5, 6, allowing the electromagnet 8 to stay in contact with the conducting surface floor 38 in the event that the walker's wheels or legs lift slightly from the floor as the user begins to lose balance, before the magnetic anti-tipping system is activated. The spring 12 holds the electromagnet 8 close to the conducting surface, here the floor 38, allowing the electromagnet 8 to travel downwards to a certain degree so as to maintain a working distance to the magnetically attractive surface. The spring 12 provides a suspension for the electromagnet 8. The suspension can be dampened as necessary for improved mechanical control.

The electromagnets' attractive force to the magnetically attractive surface, for example floor, diminishes quickly in relation to their distance from each other. The low friction skid 22 is attached to the bottom of the electromagnet to aid in preventing the electromagnet from catching on uneven surfaces as it moves in the forward, reverse and sideways directions.

Operation of the magnetic anti-tipping device includes a pressure sensing electric pad 20, which interacts with the CPU/battery pack 18. Preferably, the pressure sensing electric pad 20 activates the electromagnet when the pressure sensing electric pad 20 is not sensing pressure. The tipping sensor can include a pressure sensor pad 20 which is a mechanical switch, with an accelerometer which can be an electronic component soldered to a printed circuit board, and a tilt sensor which can also be an electronic component soldered to a circuit board. The pressure sensing electric pad 20 can operate mechanically, or using capacitance sensor technology.

Operation of the magnetic anti-tipping device is not limited to the pressure sensing pad 20 but includes any kind of interaction, mechanically or electrically, that will activate and deactivate the electromagnets at the election of the user. The control panel for the magnetic anti-tipping device 24 is also depicted in detail at FIG. 8 and described below. The wheels 16 are components of the prior art walker mobile balance and mobility aid.

Figure 4:
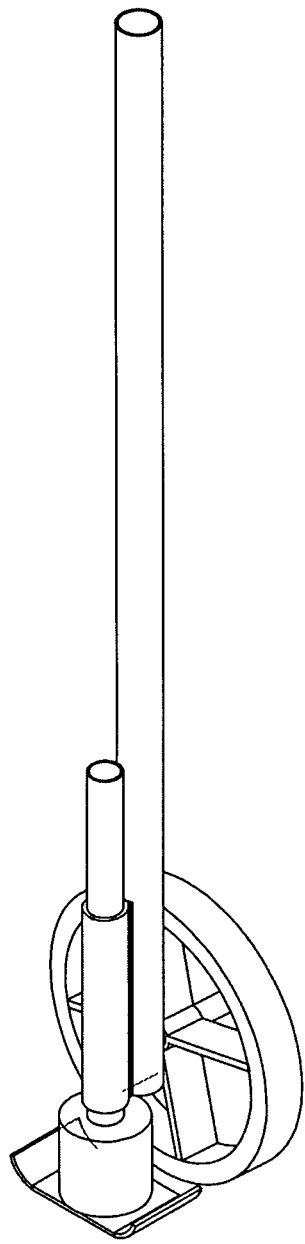
FIG. 4 is an isometric view of the electromagnet walker movement compensation system.
Figure 5:
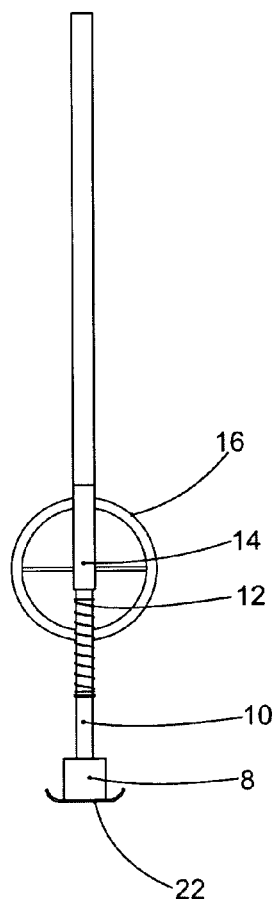
FIG. 5 is an exploded side view of the front leg electromagnet walker movement compensation system.
Figure 6:
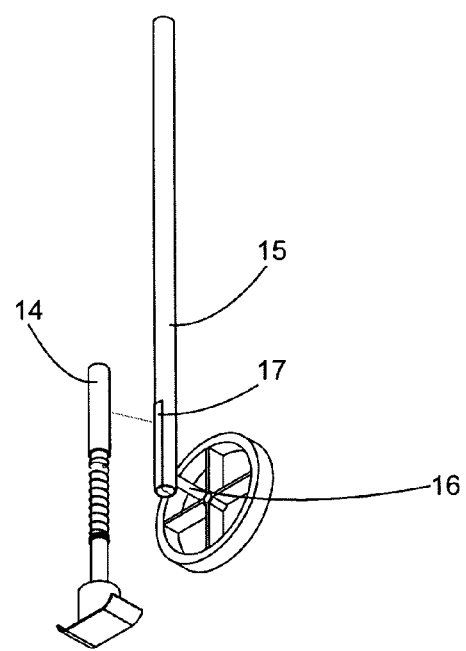
FIG. 6 is an exploded isometric view of the front leg electromagnet walker movement compensation system.

FIG. 4 shows an unexploded view of the electromagnet movement compensation system. FIGS. 5, 6 both depict the internal workings of the electromagnet movement compensation system. FIG. 5 shows a neutral position of the spring when the spring is at full extension and providing the push rod 10 a full extension. The full extension pushes and extends the push rod 10 so that the electromagnet 8 extends beyond one diameter of the wheel 16. As seen in FIG. 6, the sleeve 14 can be mounted to a flat portion 17 of the frame 15.

Figure 7:
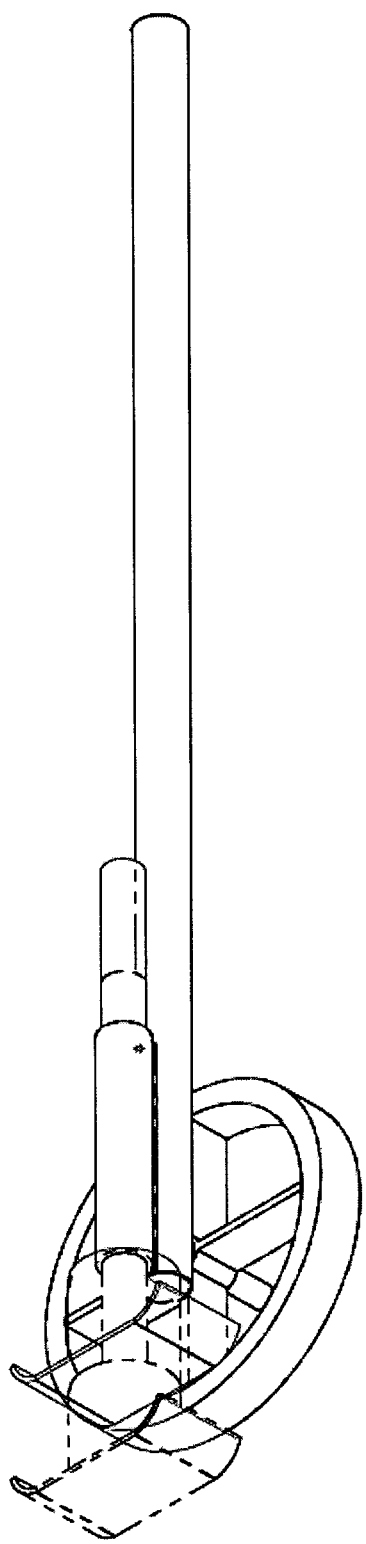
FIG. 7 is an unexploded alternate position view of the electromagnet walker movement compensation system.

This system consists of a spring 12 to hold the electromagnet 8 on the conducting surface 38, a push rod 10 to translate the force of the spring to the electromagnet 8, and a sleeve 14 to house the spring 12 and pushrod 10 and attach the system to the prior art. The sleeve is a housing that can be formed of a metal tubular member and optionally has a pair of mounting holes to allow mounting to a mobility aid such as a walker or scooter. The sleeve 14 can be mounted to a frame of the mobility aid device. The sleeve can be made as a rectangular cross-section member or the circular cross-section member, as seen in the drawings. The sleeve may also include a bracket for mounting the sleeve to the frame of the mobility aid device. The wheels 16 are components of the prior art walker, which is a balance and mobility device. FIG. 7 depicts an unexploded, alternate position view of the electromagnet movement compensation system.

Figure 8:
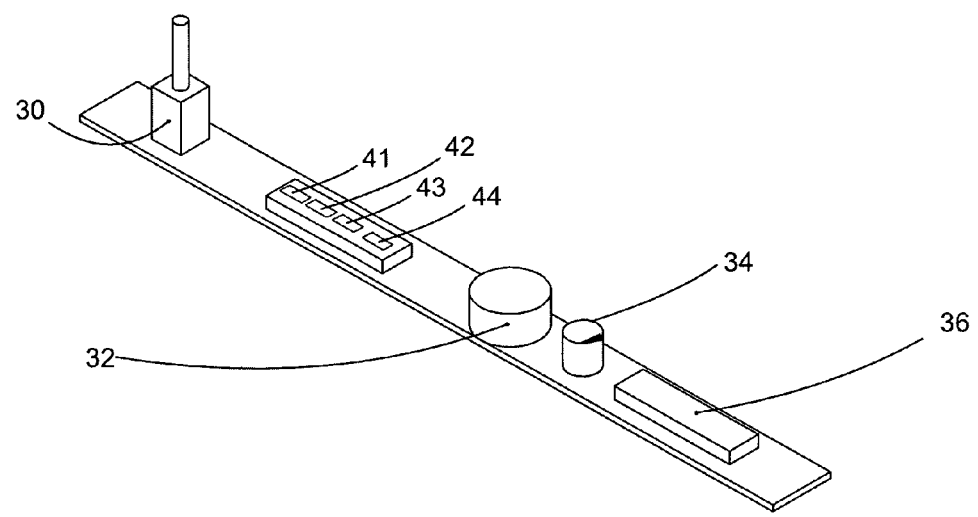
FIG. 8 is an isometric view of the control panel of the electromagnet walker movement compensation system.
Figure 9:
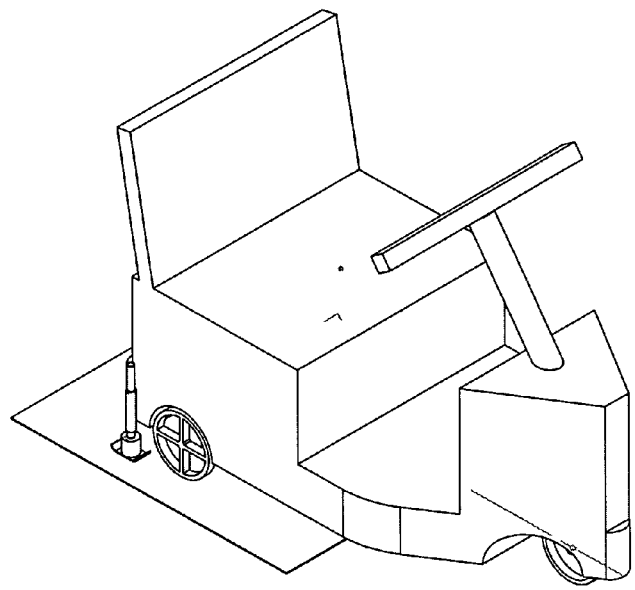
FIG. 9 is an isometric view showing an unexploded view of a mobility scooter with the electromagnetic anti-tipping safety device attached.
Figures 10, 11:
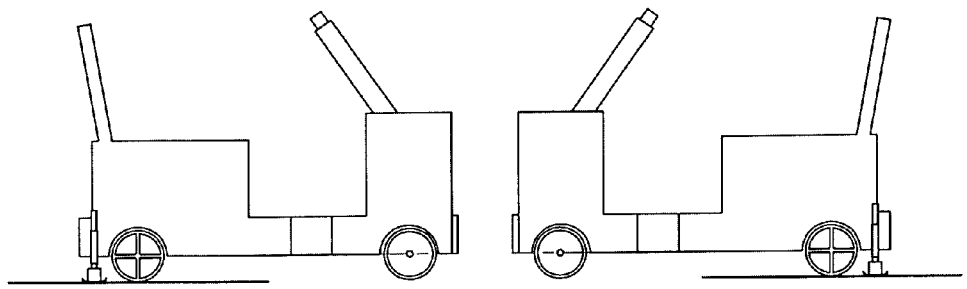
FIG. 10 is an isometric right side view showing an unexploded view of a mobility scooter with the electromagnetic anti-tipping safety device attached.
FIG. 11 is an isometric left side view showing an unexploded view of a mobility scooter with the magnetic anti-tipping safety device attached.
Figure 12:
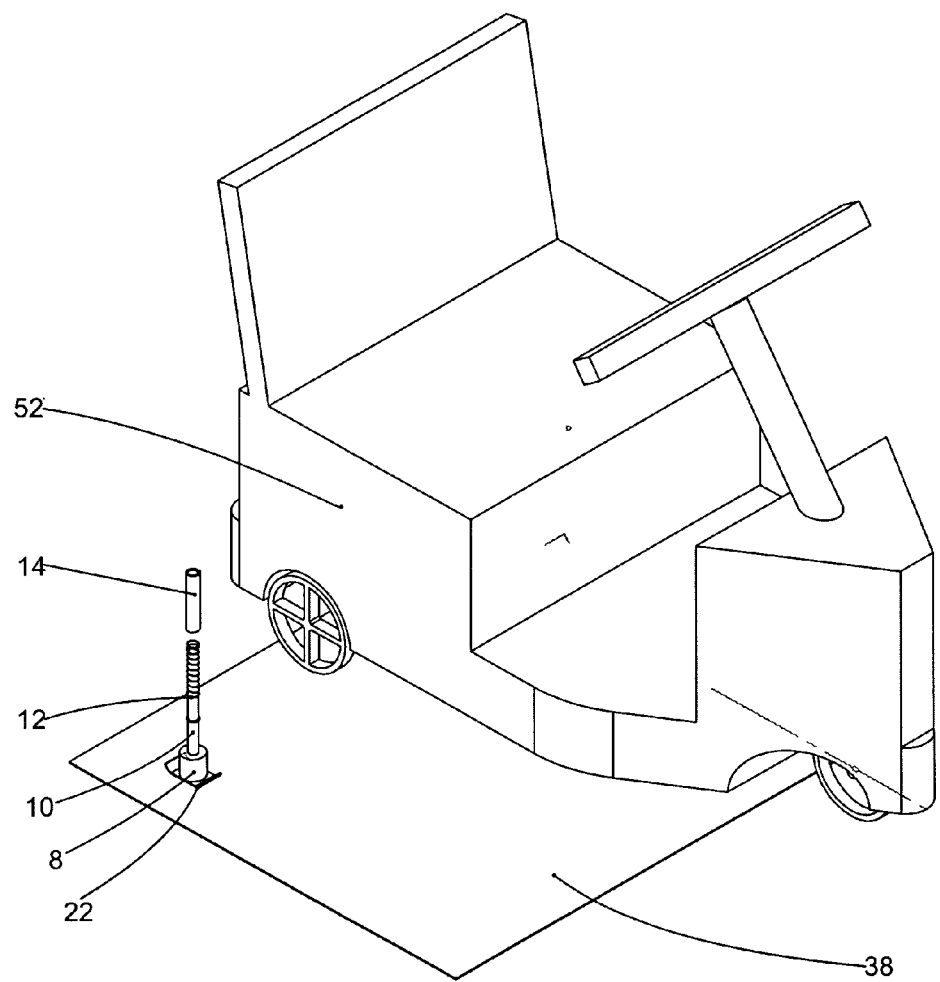
FIG. 12 shows an exploded view of a mobility scooter with the magnetic anti-tipping safety device attached.
Figure 13:
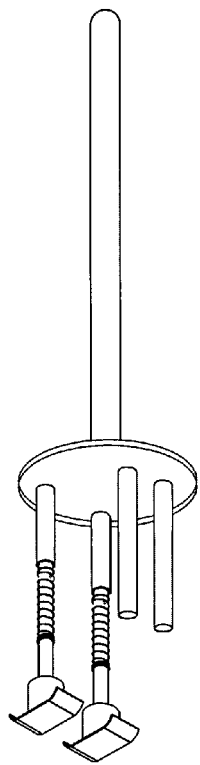
FIG. 13 is a four point cane with two regular points and two electromagnetic points.
Figure 14:
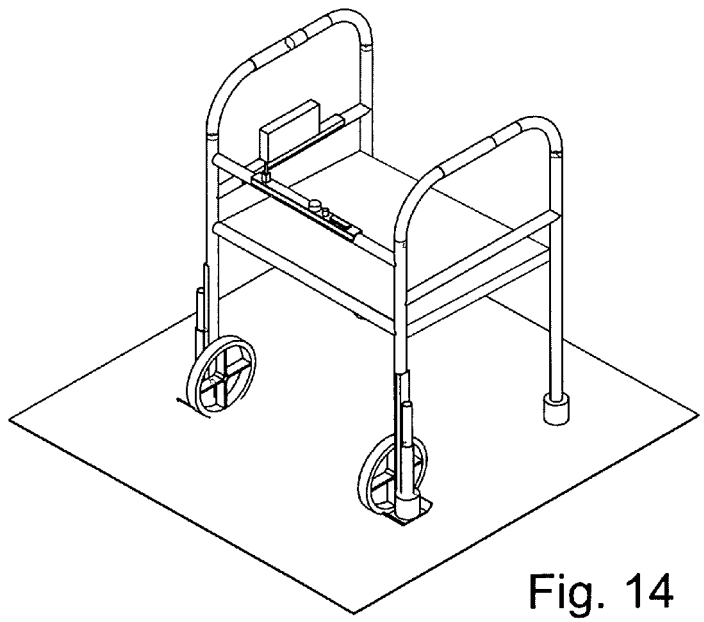
FIG. 14 is a shower seat with four electromagnetic points.

FIG. 8 depicts the control panel for the magnetic anti-tipping device. The control panel has a switch 30 allowing the user to statically leave the electromagnets in an active state in the event that the user wants the balance and mobility device, such as a walker or four-point cane, to become a static, fixed object that can be used, for example, as a grab bar or railing. Also on the control panel is a battery level indicator 36 showing the current power level of the CPU/battery pack 18. Emergency indicators including a speaker 32 and a light 34 alert the user of a low voltage condition of the anti-tipping device. A speaker 32 will audibly alert the user to the low voltage condition of the magnetic anti-tipping device. A light 34 will visually alert the user to the low voltage condition of the magnetic anti-tipping device.

In FIGS. 9-12, in unexploded and exploded views, an alternative embodiment of the magnetic anti-tipping safety device is depicted in its application to mobility scooters, or any type of electrically driven wheeled vehicle used for the purpose of transporting impaired persons. The electronic movement compensation system is depicted in this embodiment as attached to the rear end of a mobility scooter 52 resting on a magnetically conducting surface, or floor 38 which can be made of sheet metal such as the deck of a cruise ship. The magnetically conducting surface could be coated with a paint, an epoxy or a nonslip surface for example. The mobility scooter 52 has a frame that the magnetic anti-tipping safety device can be mounted to.

A variety of different modes can be implemented using this electromagnetic stability system. The switch 30 allows selection of a first mode which is the deactivated state, or off state when the user may be moving quickly and does not want to be hindered by the electromagnets magnets. In a second mode, an active state allows the frame to remain static for user to have the electromagnets on. Because the switch is located near the end of the user on the frame, the switch 30 can be activated when the user requires additional stability. The switch can be a momentary switch or a toggle switch.

An optional third mode is a sensor tipping mode that provides a tipping sensor 41 implemented by incorporating a tilt sensor 42 or accelerometer 43 or both to provide an activation of the electromagnetic stability system when the tilt sensor 42 or accelerometer 43 or both reach a certain preset amount. A processor 44 can receive a signal from a tilt sensor 42 or an accelerometer 43. For example, if a user is on a ship that is listing by a certain number of degrees, the tilt sensor 42 can activate the electromagnets before the user loses balance. The sensor tipping mode can also assist a user in case the frame of the mobility aid device suffers sudden instability due to a collision. In case of collision, the processor 44 can receive a signal from the accelerometer 43 that indicates that the electromagnets 8 of the electromagnetic stability system should be activated. The third mode can be activated by a separate switch, or by the main switch 30.

The processor can be configured to analyze the data from the combination of the tilt sensor 42 with the accelerometer 43 so as to initiate automatic activation of the electromagnets only when sudden tilting is detected. Sudden tilting occurs when the tilt sensor 42 and the accelerometer 43 both sense a value beyond a preset limit. The tilt sensor can be set to 10° and the accelerometer can also have a preset value. The tilt sensor can have double axis in both the forward and sideways direction so as to output a single tilt value. The tilt sensor, or pair of tilt sensors and the accelerometer or pair of accelerometers can be mounted with the processor on a printed circuit board. Preferably, the printed circuit board would be housed on an electronic housing that is mounted to the frame. The pair of tilt sensors and the pair of accelerometers both output a continuous stream of data to the processor.

The tipping sensor can include the pressure sensor pad 20 as a mechanical switch, an accelerometer as an electronic component, and also a tilt sensor as an electronic component. The combination of three sensors to form the tipping sensor potentially allows a processor to have a very accurate tipping sensing. The processor may also have a memory that has preprogrammed frame physics located within the processor. The tilt sensor could be combined with the pressure sensor pad 20 so that one or both are required for activation of the electromagnet. Having all three sensors to form the tipping sensor provides for enhanced fall protection. The pressure sensor pad 20 can be formed as a curved sheet of metal that has a capacitance sensing function. The curve of the pressure sensor pad 20 can be conformed to a pair of handles of a walker and could also be conformed to a steering wheel of a mobility scooter 52 for example. The pressure sensor pad 20 is preferably wired to the processor 44 in an electrical circuit.

The mobility aid means is preferably selected from the group of: a four point cane, a walker having wheels, a walker without wheels, a walker having pivoting wheels, a mobility scooter, a shower seat, a toilet seat frame, and a mobile grab bar. The mobile grab bar can be formed as a walker. The toilet seat frame can also be made as a walker.

The above description is provided to enable a person skilled in the art to practice the various embodiments described. Various modifications to these embodiments will be readily apparent to those skilled in the art, and the principles defined herein may be applied to other embodiments. Thus, the appended claims are not intended to be limited to the embodiments shown herein, but are to be accorded the full scope consistent with the language in the claims with reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. section 112, paragraph 6, unless the element is expressly recited using the phrase "means for" or, in the case of a method claim, the element is recited using the phrase "step for." The scope of protection is limited solely by the claims that now follow. The scope is intended to be as broad as reasonably consistent with the language that is used in the claims and to encompass all structural and functional equivalents. The mechanism could be reconstructed using a different system than the system identified and described as the electromagnetic movement compensation system and still accomplish the same goal, and is therefore covered within the scope of this invention.

The invention claimed is:

1. An anti-tipping mechanism comprising:
    a. a mobility aid having a frame;
    b. electromagnets temporarily securing and balancing the mobility aid, wherein the electromagnets are attached to the frame of the mobility aid, wherein the electromagnets secure and balance the frame when activated by attracting to a floor that the mobility aid is moving upon, wherein the electromagnets are secured to the frame at a lower portion of the frame, wherein the electromagnets are attracted to the floor when the electromagnets are activated so that the frame is secured to the floor.

2. The anti-tipping mechanism of claim 1, wherein the mobility aid remains in contact with the magnetic surface when the mobility aid is lifted slightly off the magnetic surface.

3. The anti-tipping mechanism of claim 1, further including controls for allowing direct or indirect operation by the operator of the balance and mobility aid device, wherein the controls activate the mobility aid.

4. The anti-tipping mechanism of claim 1, wherein the mobility aid is a mobility aid means.

5. The anti-tipping mechanism of claim 1, further comprising a magnetic surface for attracting to the electromagnet by electromagnetic attraction.

6. An anti-tipping mechanism for use on a floor comprising:
    a. a mobility aid having a frame;
    b. electromagnets mounted to the frame, wherein the electromagnets secure and balance the frame when activated by attracting to the floor that the mobility aid is moving upon, wherein the electromagnets are secured to the frame at a lower portion of the frame;
    c. a battery that is electrically connected to the electromagnets for activating the electromagnets;
    d. a control having a first mode, and a second mode, wherein the first mode deactivates the electromagnets, and wherein the second mode activates the electromagnets when a tipping sensor is triggered.

7. The anti-tipping mechanism of claim 6, further comprising a spring that provides a suspension to the electromagnet, wherein the electromagnet contacts with the floor when a portion of the mobility aid is lifted above the floor.

8. The anti-tipping mechanism of claim 6, wherein the control further includes a third mode, wherein the third mode selectively activates the electromagnets.

9. The anti-tipping mechanism of claim 8, further comprising a tipping sensor configured to sense tipping of the mobility aid, wherein the electromagnet is configured to activate when the tipping sensor senses tipping of the mobility aid, wherein the tipping sensor includes a pressure sensor.

10. The anti-tipping mechanism of claim 8, further comprising a pair of wheels connected to the lower portion of the frame, wherein the wheels provide a rolling movement for the user.

11. The anti-tipping mechanism of claim 8, wherein the mobility aid is a walker.

12. The anti-tipping mechanism of claim 8, further comprising a tipping sensor configured to sense tipping of the mobility aid, wherein the electromagnet is configured to activate when the tipping sensor senses tipping of the mobility aid; and
    further comprising a pair of wheels connected to the lower portion of the frame, wherein the wheels provide a rolling movement for the user; and further comprising a spring that provides a suspension to the electromagnet; wherein the electromagnet contacts with the floor when a portion of the mobility aid is lifted above the floor.

13. The anti-tipping mechanism of claim 12, wherein the mobility aid is a walker.

14. The anti-tipping mechanism of claim 12, wherein the tipping sensor also includes a two axis accelerometer and a two axis tilt sensor that work in conjunction with the pressure sensor.

* * * * *